United States Patent
Beckhoff et al.

(10) Patent No.: US 7,852,857 B2
(45) Date of Patent: Dec. 14, 2010

(54) COUPLER FOR A RING TOPOLOGY NETWORK AND AN ETHERNET-BASED NETWORK

(75) Inventors: Hans Beckhoff, Verl (DE); Holger Büttner, Berlin (DE)

(73) Assignee: Beckhoff Automation GmbH, Verl (DE)

( * ) Notice: Subject to any disclaimer, the term of this patent is extended or adjusted under 35 U.S.C. 154(b) by 1132 days.

(21) Appl. No.: 10/544,425

(22) PCT Filed: Feb. 2, 2004

(86) PCT No.: PCT/EP2004/000934
§ 371 (c)(1),
(2), (4) Date: May 3, 2006

(87) PCT Pub. No.: WO2004/071025
PCT Pub. Date: Aug. 19, 2004

(65) Prior Publication Data
US 2006/0212604 A1    Sep. 21, 2006

(30) Foreign Application Priority Data
Feb. 4, 2003   (DE) ................. 103 04 637

(51) Int. Cl.
*H04L 12/28* (2006.01)
(52) U.S. Cl. ............... 370/395.53; 370/85.15; 370/221; 370/225; 370/235; 370/386
(58) Field of Classification Search ........... 370/84, 370/85.15, 221, 225, 228, 235, 386, 419, 370/421, 460, 466
See application file for complete search history.

(56) References Cited

U.S. PATENT DOCUMENTS

| | | | | |
|---|---|---|---|---|
| 4,498,168 A | * | 2/1985 | Tseng | 370/228 |
| 4,604,742 A | * | 8/1986 | Hamada et al. | 370/454 |
| 4,860,006 A | * | 8/1989 | Barall | 370/447 |
| 5,001,707 A | * | 3/1991 | Kositpaiboon et al. | 370/440 |
| 5,119,373 A | * | 6/1992 | Fredricsson et al. | 370/458 |
| 5,157,657 A | * | 10/1992 | Potter et al. | 370/440 |
| 5,189,541 A | * | 2/1993 | Konishi | 398/59 |
| 5,214,645 A | * | 5/1993 | Hagirahim | 370/440 |
| 5,251,213 A | * | 10/1993 | Videlock et al. | 370/403 |
| 5,388,097 A | * | 2/1995 | Baugher et al. | 370/455 |
| 5,400,334 A | * | 3/1995 | Hayssen | 370/245 |
| 5,402,422 A | * | 3/1995 | Liu et al. | 370/443 |
| 5,434,861 A | * | 7/1995 | Pritty et al. | 370/449 |
| 5,479,404 A | * | 12/1995 | Francois et al. | 370/468 |
| 5,500,854 A | * | 3/1996 | Uotila | 370/254 |
| 5,563,876 A | * | 10/1996 | Duxbury et al. | 370/402 |
| 6,005,869 A | * | 12/1999 | Sakai et al. | 370/452 |

(Continued)

*Primary Examiner*—Ayaz R Sheikh
*Assistant Examiner*—Andrew C Lee
(74) *Attorney, Agent, or Firm*—Faegre & Benson LLP

(57) ABSTRACT

A network coupler is provided between a network, on which Ethernet messages can be transmitted, and a plurality of subscribers, the network being linked to an external interface of the network coupler and the plurality of subscribers being linked in series to a ring-type transmission path via an internal interface of the network coupler. For interchanging data, an Ethernet message received via the external interface of the network coupler is forwarded to the internal Ethernet interface of the network coupler and is output onto the ring-type transmission path, each subscriber connected to the internal interface interchanging the useful data intended for the respective subscriber with the Ethernet message circulating on the ring-type transmission path.

20 Claims, 3 Drawing Sheets

U.S. PATENT DOCUMENTS

| | | | |
|---|---|---|---|
| 6,032,185 A * | 2/2000 | Asano | 709/227 |
| 6,076,117 A * | 6/2000 | Billings | 709/253 |
| 6,611,537 B1 * | 8/2003 | Edens et al. | 370/503 |
| 6,747,985 B1 * | 6/2004 | Lovette | 370/460 |
| 6,853,623 B2 * | 2/2005 | Nederveen et al. | 370/250 |
| 6,944,165 B2 * | 9/2005 | Fujiyama et al. | 370/400 |
| 6,999,452 B1 * | 2/2006 | Drummond-Murray et al. | 370/389 |
| 7,143,301 B2 * | 11/2006 | Pearce et al. | 713/401 |
| 7,289,496 B2 * | 10/2007 | Donoghue et al. | 370/386 |
| 7,406,354 B2 * | 7/2008 | Pearce et al. | 700/61 |
| 2004/0037278 A1 * | 2/2004 | Wong et al. | 370/389 |
| 2006/0077991 A1 * | 4/2006 | Kawarai | 370/403 |

* cited by examiner

COUPLER FOR A RING TOPOLOGY NETWORK AND AN ETHERNET-BASED NETWORK

BACKGROUND OF THE INVENTION

What is currently the most widespread standard for local communication networks, so-called "local area networks" (LANs) is Ethernet. With Ethernet, data can currently be transmitted at a rate of up to 100 Mbit/sec (Mbps). LANs are local communication networks which are limited to a geographical area and are composed of one or more servers and workstations, so-called nodes, which are connected via a communication line network, e.g. a coaxial, fiber-optic or twisted pair cable. Various network topologies, e.g. bus, star or tree structures, are possible in the case of LANs.

LANs are operated by means of a network operating system and a network protocol. Ethernet constitutes such a network protocol. Furthermore, Ethernet supports a wide variety of communication protocols e.g. the TCP/IP protocol or the IPX protocol. In the OSI layer model, the international reference model for data transmission in a network, which is constructed from a layer stack comprising seven layers, a set of protocols being defined for each layer and in each case making their services available to the next higher layer, Ethernet is assigned to the second layer, the so-called data link layer. In this data link layer, the data to be communicated are bundled in packets to which specific items of information for the respective communication protocol are added. The data link layer is responsible in the network for the transport of the data packets from node to node and for error detection.

In the case of the Ethernet concept, the data link layer is subdivided into two levels, the first level adding to the data a so-called header, which contains items of information which are required for a correct data transmission by the receiver protocol. In the second level of the Ethernet protocol, the data packets are then encapsulated with the aid of an additional header and a further so-called trailer for the transport of the data packets from node to node. With such Ethernet data packets, so-called Ethernet messages, it is possible to transmit data with a length of up to 1500 bytes.

Ethernet furthermore defines the access method with regard to how the individual nodes are permitted to utilize and occupy the physical connecting paths of the network. In this case, Ethernet operates according to the so-called CSMA/CD (carrier sense multiple access/collision detect) access method. In the case of this access method, the node wishing to transmit checks prior to transmission whether the transmission path is free. The data are then sent. Since all nodes can send their data simultaneously, collisions may occur. The transmission operation is then interrupted by the node which notices the collision. In order to prevent two nodes from starting transmission in a manner offset by a short period of time, all transmitting nodes generate a so-called JAM signal in order that all nodes situated on the transmission path terminate the processing of the current data packet and thus do not disturb the transmission operation.

The Ethernet protocol is principally used in office communication networks. On account of the advantages of the Ethernet concept, in the use of standard hardware and software components and also the possibility of achieving high data transmission rates even with simple networking technology, there is a desire to be able to use the Ethernet network communication also in industrial production for data interchange and for carrying out control tasks.

However, in particular the deficient real-time capability of the Ethernet protocol has hitherto permitted only limited use in automation technology. This is because the control of machinery requires a cyclic processing of the control task to ensue without temporal fluctuations, i.e. with only small deviations from the desired cycle time in the region of a few microseconds, the system reacting to the regulating request with a predictable response time. However, the CSMA/CD access method used by Ethernet does not guarantee such fixed reaction times. This is because in the event of very high network capacity utilization, it can happen on account of the access method used that Ethernet messages cannot be transmitted over a certain time period, so that a guaranteed response time to a regulating request is not ensured.

In order nevertheless to be able to achieve real time to an extent in Ethernet networks, such Ethernet networks are often constructed in a star topology using so-called switches. In this case, each node, also referred to hereinafter as subscriber, has a point-to-point connection to the switch of the network. The switch examines each Ethernet message passing through on the network with regard to the address of the addressed subscriber and then forwards the Ethernet message to the addressed subscriber via the corresponding point-to-point connection. However, such a network topology made up entirely of point-to-point connections between the subscribers and the central switch requires complicated cabling and is therefore associated with high costs.

In order to ensure real-time capability and fast reaction times in Ethernet networks, there is furthermore the possibility of allowing the operation for transmission of the Ethernet messages to be controlled by superordinate protocol layers instead of by the CSMA/CD access method. However, the consequence of this is that the additional real-time protocol layer required gives rise to an intensified capacity utilization at the subscribers, which therefore require a powerful microcontroller, which in turn results in high costs.

Furthermore, the transmission of Ethernet data packets having lengths of up to 1500 bytes and high data transmission rates of 100 Mbit/sec requires that the Ethernet interfaces provided at the individual subscribers are upgraded with powerful data processing units in order to be able to store and rapidly read out the large data packets.

Particularly when control tasks require process data with only a small number of bytes, the mandatorily required data length of the Ethernet messages prevents a cost-effective interface design. This is because Ethernet, as a station-oriented network, requires data lengths of at least 100 bytes, which, at a high data transmission rate of 100 Mbit/sec, as explained, necessitates a powerful microcontroller for the transmission and reception operation. This holds true all the more if, in order to ensure a real-time capability, a real-time communication protocol is superposed on the CSMA/CD access method of the Ethernet protocol, so that in principle large Ethernet message packets already result on account of this additional protocol.

SUMMARY OF THE INVENTION

It is an object of the present invention to provide a network coupler for Ethernet, an Ethernet network and also an Ethernet data transmission method by means of which real-time control tasks can be executed with the aid of Ethernet messages in a simple and cost-effective manner.

This object is achieved by means of a network coupler, a network and a method according to the claims. Preferred developments are specified in the dependent claims.

According to the invention, the subscribers provided for the real-time application are connected to a ring-type transmission path, said ring-type transmission path being connected to a network, on which Ethernet messages can be transmitted, via a network coupler, the network coupler being designed such that an Ethernet message received from the network via an external interface of the network coupler is forwarded to an internal interface of the network coupler and is output on the ring-type transmission path, each subscriber connected to the ring-type transmission path, upon the Ethernet message passing through on the ring-type transmission path, interchanging the useful data intended for the respective subscriber with the Ethernet message circulating on the transmission path.

In the case of this network design, the ring-type transmission path with the network coupler and the subscribers connected to the transmission path via the network coupler appears to the network to be a single Ethernet subscriber. The network coupler and the subscribers connected to the ring-type transmission path share a single Ethernet connection, as a result of which it is possible to dispense with additional, powerful microcontrollers—required in the prior art—for processing the Ethernet messages in the respective subscribers themselves. As a result of the processing of the Ethernet messages on the ring-type transmission path in the course of passing through the subscribers connected thereto, the reaction time of the individual subscribers is substantially reduced, so that control tasks can be executed in real time with the circulating Ethernet messages. In particular, it is also possible to use standard Ethernet messages—customarily having a data length of hundreds of bytes—also to drive, simply and cost-effectively, subscribers which require only few bytes of process data. In particular, it is not necessary for the individual subscribers to have a complicated data storage and processing unit in order to perform the protocol processing required in the case of Ethernet messages.

In accordance with one preferred embodiment, the Ethernet message is converted from the transmission physics of the network to the transmission physics of the ring-type transmission path in the network coupler. This makes it possible to equip the ring-type transmission path with simpler and less expensive transmission physics with a smaller range in comparison with the Ethernet network. Thus, it is possible e.g. to effect transition from a network fiber-optic cable to a ribbon cable via which LVDS signals can be transmitted, or to an optical waveguide cable with the aid of the network coupler.

In accordance with a further preferred embodiment, a filtering of Ethernet messages which are not intended for the subscribers connected to the ring-type transmission path is carried out in the network coupler. This prevents Ethernet messages that are not required for the control tasks from circulating on the ring-type transmission path and thus impairing the possible reaction times of the subscribers.

In accordance with a further preferred embodiment, the network coupler has a microcontroller for processing acyclic, non-time-critical data transmitted on the network. This is advantageous particularly when the Ethernet messages are transmitted with superordinate programs, e.g. TCP/IP protocols or IPX protocols, on the network, so that the microcontroller, in the Ethernet coupler, can then perform the required protocol conversions in a simple manner.

It is preferred, moreover, for the ring-type transmission path to be a two-channel line, the network coupler outputting the Ethernet messages to the connected subscribers on the first channel of the two-channel line, and the last subscriber connected to the two-channel line as seen from the network coupler then returning on the second channel the Ethernet messages that have passed through and been modified, if appropriate, each subscriber interposed up to the network coupler conveying the returned Ethernet messages. This design makes it possible to use a single cable, e.g. a twisted pair cable containing such a two-channel line for the ring-type transmission path. In this case, the last connected subscriber only has to carry out the feedback of the Ethernet message from the first channel to the second channel.

BRIEF DESCRIPTION OF THE DRAWINGS

The invention is explained in more detail with reference to the accompanying drawings, in which.

DESCRIPTION

With local communication networks (LANs), it is possible in a simple manner for data and resources to be interchanged between workstations, generally computers or machines, also called nodes or subscribers hereinafter, and to be utilized jointly. In this case, the Ethernet concept is the most widespread communication standard in LANs.

In the case of Ethernet networks, the plurality of nodes are connected to one another via a common transmission medium, the data to be communicated being encapsulated in so-called data packets, also referred to hereinafter as Ethernet messages, with a predetermined format.

Ethernet comprises three areas, namely the transmission medium and the network interfaces, i.e. the hardware, the set of protocols which control access to the transmission medium, and the Ethernet packet form. In this case, Ethernet represents in principle a bus network, it being possible to use any desired network topologies, e.g. star, bus or tree networks. In this case, Ethernet data transmission usually takes place with the aid of the CSMA/CD access method, in the case of which a data transmission is only carried out if the network is calm. Furthermore, a collision prevention mechanism is provided. In this case, the Ethernet data packet itself may have a data length of up to 1500 bytes, the data being encapsulated by means of header and trailer specifying a start identifier, the destination and source address, the data packet type and the error detection mechanism.

Ethernet has gained acceptance as a communications standard for network systems primarily in office communication since standard hardware components and software protocols can be utilized and, moreover, high data transmission rates are possible. For this reason, it is also desirable to be able to utilize the Ethernet standard in an industrial environment in data transmission, in particular of control tasks. The essential problem in this case consists in the lack of real-time capability of the Ethernet standard, so that automation tasks with real-time applications are generally carried out separately from Ethernet communication networks in autonomous control assemblies, so-called field bus systems.

Figure 1A:
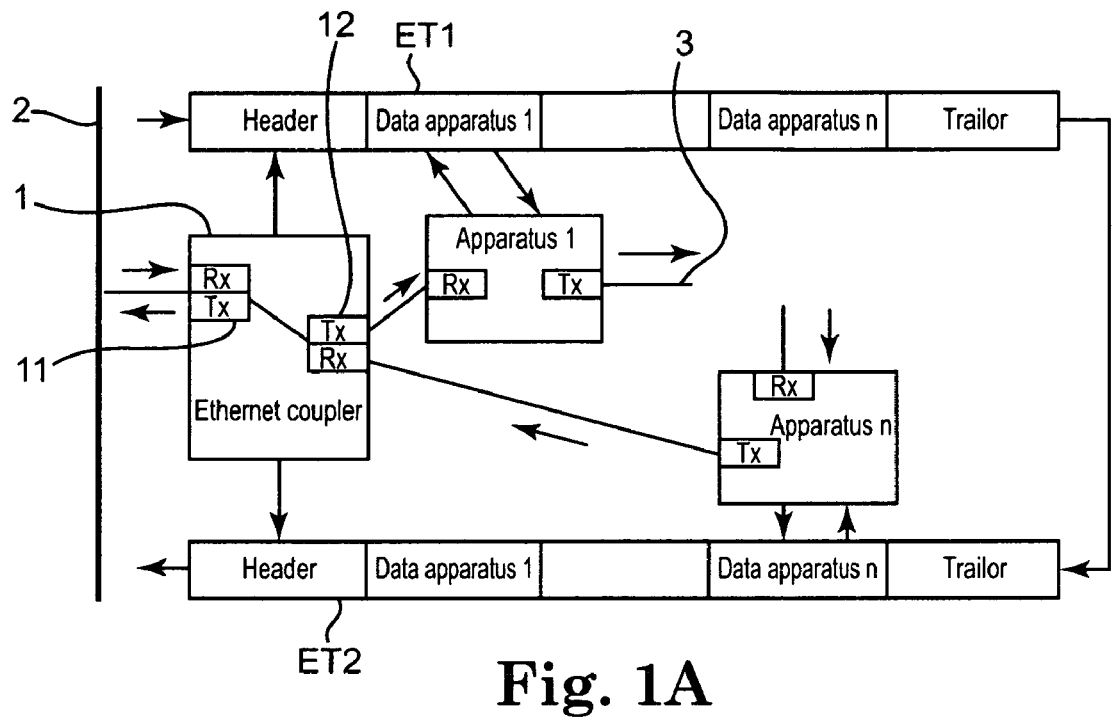
FIGS. 1A and B show a network according to the invention with a network coupler and subscribers connected to the network coupler in ring-type fashion, which execute a processing according to the invention of an Ethernet message in a pass, FIG. 1A representing an embodiment with a ring line and FIG. 1B an embodiment with a two-channel line.

In order to be able to use the Ethernet standard and a correspondingly designed network in a simple and cost-effective manner also for the execution of automation tasks, in particular those in which the individual subscribers involved in the control require process data of only a small number of bytes, according to the invention, as shown in FIG. 1A, a network construction is realized in which provision is made of an additional network coupler 1, also referred to hereinafter as Ethernet coupler, which has an external interface 11 for linking to an Ethernet network 2. In the embodiment shown in FIG. 1A, the Ethernet coupler 1 is in this case connected by its external interface 11 directly to the network transmission medium. The transmission medium may be a coaxial cable, a twisted power cable or a fiber-optic cable.

The external interface 11 of the network coupler 1 is equipped with a reception unit RX for receiving an Ethernet message from the network transmission medium 2 and a transmission unit TX for transmitting an Ethernet message on the network transmission medium 2. FIG. 1 shows such an Ethernet message ET1 received by the Ethernet coupler 1 and an Ethernet message ET2 transmitted by the Ethernet coupler 1. Each of the two Ethernet messages ET1, ET2 is composed of a header with the reception identifier and the destination and source address, a data area and also a trailer specifying a packet length and an error detection mechanism. The data area provided between the header and the trailer contains the process data which are required for the control task and preferably represent an entire process image. These process data are in turn preferably grouped in data blocks required for the individual subscribers of the control task, i.e. for subscriber apparatus 1 "data apparatus 1" etc.

The Ethernet coupler 1 is furthermore connected via an internal interface 12 to a series of subscribers, which are identified as apparatus 1 to n, via a ring-type transmission path 3. This ring-type transmission path 3 interconnects the subscribers apparatus 1 to n to form a ring topology, a transmission unit TX of the internal interface 12 of the Ethernet coupler 1 serving as data coupling-in location and a reception unit RX of the internal interface 12 of the Ethernet coupler 1 serving as the data coupling-out location.

The individual subscribers on the transmission path 3 are interconnected to form a chain, each subscriber being connected to two neighbors and the first and last subscribers in the chain in this case being connected to the Ethernet coupler 1. In this case, the data transmission is effected in a direction proceeding from the Ethernet coupler 1 to the subscriber apparatus 1 and from there as far as the subscriber apparatus n and then back into the Ethernet coupler 1. The transmission direction is indicated by an arrow in FIG. 1A. Each subscriber has an interface with a reception unit RX for receiving the circulating Ethernet message from the previous subscriber and an interface with a transmission unit TX for passing it on to the next subscriber.

The data interchange is effected as follows in this case: the Ethernet message ET1—sent by the network 1—with the process data for the individual subscribers of the automation task is received by the reception unit RX of the external interface 11 which connects the network to the Ethernet coupler 1. The received Ethernet message is then passed on from the external interface 11 to the internal interface 12, the transmission unit TX of the internal interface 12 outputting the Ethernet message immediately on to the ring-type transmission path 3 without any appreciable delay.

Each subscriber connected to the ring-type transmission path 3 then takes the process data intended for it from the circulating Ethernet message (arrows in FIG. 1A), i.e. the subscriber apparatus 1 takes the "data apparatus 1", etc. and, for its part, inserts the process data resulting from the process implementation in turn at the corresponding location in the Ethernet message. The Ethernet message circulating in this way, after passing through the last subscriber apparatus n, is then transmitted to the reception unit RX of the internal interface 12 of the Ethernet coupler 1 and forwarded from there to the external interface 11, which feeds the Ethernet message ET2 into the Ethernet network 1 by means of the transmission unit TX. The described data construction of the circulating Ethernet messages is only by way of example here.

The invention's solution of coupling the subscribers of an automation task to the Ethernet network via an Ethernet coupler, the subscribers being interconnected by means of a ring structure, has the advantage that the apparatuses connected to the Ethernet coupler are regarded as a single standard Ethernet subscriber by the Ethernet network. By means of the special Ethernet connection in the Ethernet coupler, the Ethernet message received by the latter is output onto the ring structure without any appreciable delay, so that each subscriber can take the data directed to it in the Ethernet message while the Ethernet message is passing through on the transmission ring and, for its part, insert the corresponding data. The advantages of this procedure are that, on account of the processing of the Ethernet message in a pass, no appreciable delays arise during the data processing and, consequently, short reaction times such as are required for a real-time application can be complied with. A further advantage is that the Ethernet connection costs per subscriber can be minimized since all connected subscribers share the Ethernet connection with the Ethernet coupler and, as a result of the processing of the Ethernet message in a pass, there is no need for any powerful microcontrollers in the apparatuses themselves.

Figure 1B:
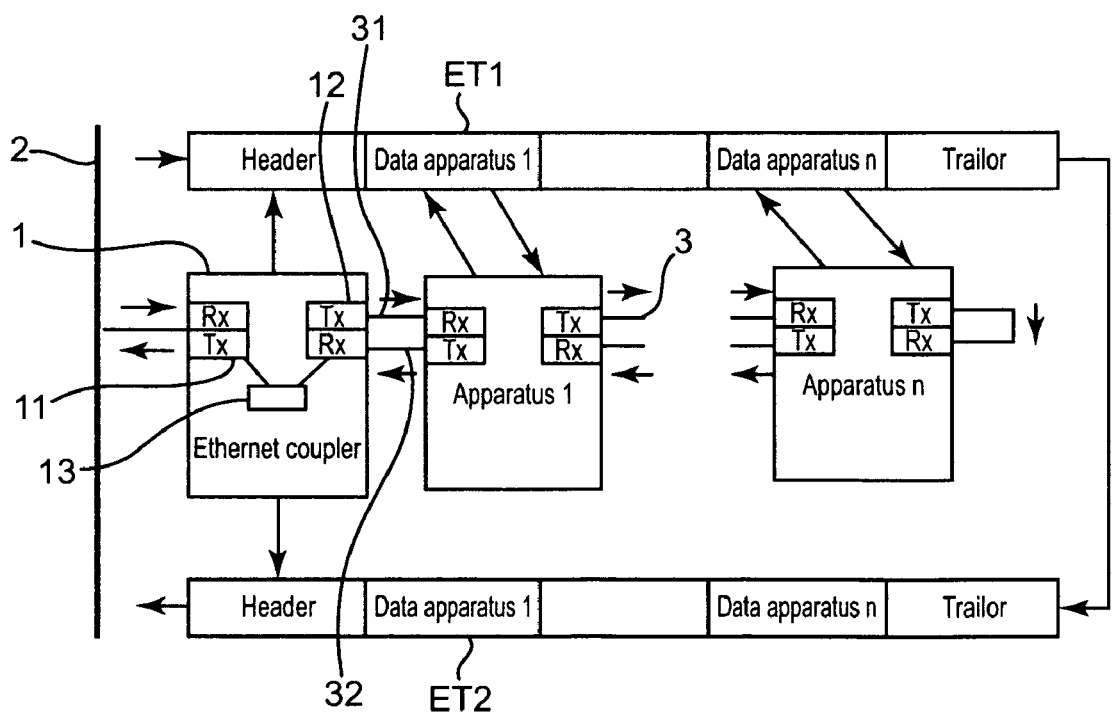

The ring-type transmission path may have simple and thus inexpensive transmission physics with a short range, too. Thus, for the transmission path it is possible to use for example a ribbon cable via which LVDS signals can be transmitted or an optical waveguide cable instead of the complicated twisted pair cable or fiber-optic cable. If the transmission physics of the Ethernet network differs from that of the ring-type transmission path, a processing device 13, as is shown in FIG. 1B, is required in the Ethernet coupler 1 in order to convert an Ethernet message from transmission physics of the network 2 to the transmission physics of the ring-type transmission path 3. This processing unit 13 is arranged between the external interface 11 and internal interface 12 of the Ethernet coupler 1. Furthermore, the processing unit 13 may, if appropriate, make necessary changes to the Ethernet message in order to guarantee the Ethernet standard for modified Ethernet messages output on the transmission path 3, e.g. by interchanging source and destination address and recalculating an Ethernet checksum.

In this case, FIG. 1B shows a further possible embodiment of the ring-type transmission path 3. Instead of a single-channel transmission path as shown in FIG. 1A, a two-channel transmission path is provided in FIG. 1B. In this case, the transmission takes place such that the Ethernet message output onto the transmission path 3 by the Ethernet coupler 1 with the process data is passed on from the subscriber apparatus 1 as far as the subscriber apparatus n on a first channel 31, each subscriber performing the desired data interchange during the pass. The last connected subscriber apparatus n then feeds the processed Ethernet message back onto a second channel 32, each further subscriber interposed between the subscriber apparatus n and the Ethernet coupler 1 only conveying the Ethernet message. This configuration makes it possible for the customarily used full-duplex transmission path of the Ethernet network also to be used for the ring-type transmission path for connecting the automation subscribers to the Ethernet coupler. Each subscriber preferably has two interfaces for passing on the Ethernet messages onto the full-duplex line, which interfaces in each case complementarily have a transmission unit TX and a reception unit RX in order to be able to transmit and receive on the first and second channels.

Figure 2:
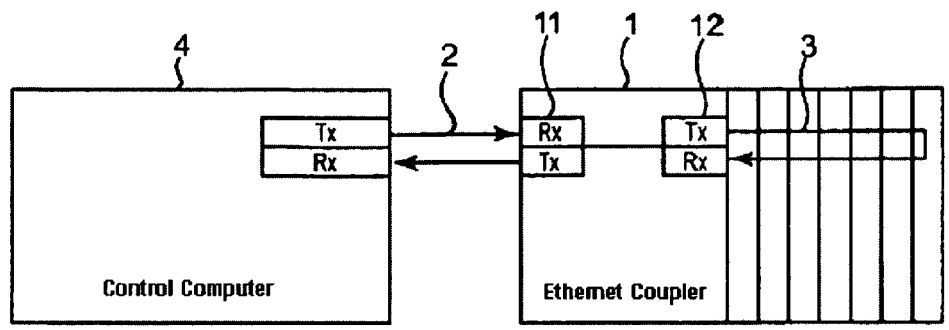
FIG. 2 shows a network according to the invention with a network coupler and connected ring-type transmission path, which is connected to a control computer via a standard Ethernet cable.

FIG. 2 shows a simple linking of the Ethernet coupler 1 to a control computer 4 via a full-duplex Ethernet cable. For the data interchange, the Ethernet coupler 1 only requires the external interface 11 and the internal interface 12 and, if appropriate, a processing unit (not shown) for converting the transmission physics. The connected apparatuses once again have an interface (not shown) which enables the Ethernet message output onto the ring-type transmission path by the Ethernet coupler to be interpreted in a pass in order to interchange the corresponding data with the connected hardware in the apparatus, in which the connected hardware may be both an interface to a microcontroller and direct process signals from signal transmitters.

Figure 3:
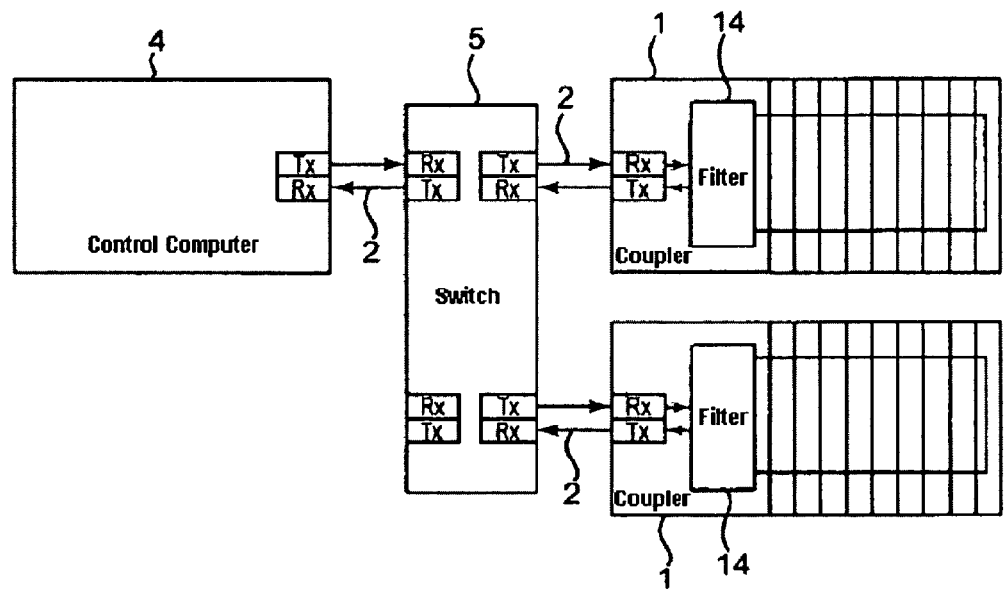
FIG. 3 shows a network embodiment according to the invention with an interposed switch, to which the network coupler according to the invention is connected.

FIG. 3 shows a further network design, in which the Ethernet coupler 1 is connected to the control computer 4 via a switch 5. In this embodiment, the Ethernet coupler 1 preferably additionally has a filter 14 which makes it possible to filter out Ethernet messages that are not intended for the subscribers connected to the network coupler. This ensures faster processing of the Ethernet messages for the automation tasks of the subscribers connected to the Ethernet coupler.

Figure 4:
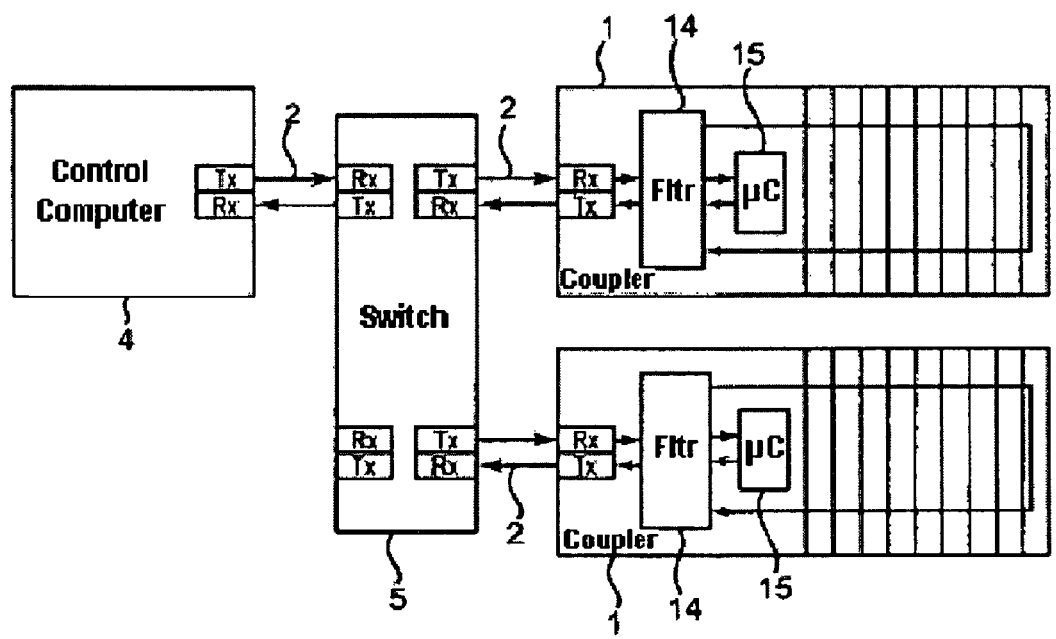
FIG. 4 shows a network according to the invention with an interposed switch, in the case of which the network is operated with higher communication protocols.

FIG. 4 shows a possible network embodiment in which the Ethernet messages are additionally managed with the aid of a superordinate communication program, e.g. TCP/IB protocol, on the network with the switch 5. For processing these superordinate protocols, the Ethernet coupler 1 then furthermore has a microcontroller 15 which is connected to the filter 14 and maps the required protocol properties. The acyclic, non-time-critical data are processed by the microcontroller 15 in the Ethernet coupler 1, whereas the Ethernet message with the time-critical data is output onto the ring-type transmission path for data interchange with the connected subscribers.

We claim:

1. A network coupler comprising:
   an external interface, for linking to a network on which Ethernet messages can be transmitted; and
   an internal interface, for linking a plurality of subscribers in series to a ring-type transmission path, with an Ethernet message received via the external interface forwarded to the internal interface and output onto the ring-type transmission path, the Ethernet message comprising a header, a trailer, and a data area between the header and trailer, the data area including a plurality of data blocks each assigned to one of the plurality of subscribers, wherein, upon the Ethernet message passing through on the ring-type transmission path, each subscriber connected to the internal interface interchanges useful data intended for the subscriber with the Ethernet message circulating on the transmission path as it passes through the corresponding subscriber, such that the subscriber takes data from the data block assigned to the subscriber in the data area of the Ethernet message and inserts data into the data block assigned to the subscriber in the data area of the Ethernet message.

2. The network coupler of claim 1, further comprising a device that converts the Ethernet messages between the transmission physics of the network and the transmission physics of the ring-type transmission path, the device provided between the external interface and the internal interface.

3. The network coupler of claim 2, further comprising a microcontroller that processes acyclic, non-time-critical data transmitted on the network.

4. The network coupler of claim 2, further comprising a device that filters out Ethernet messages not intended for the subscribers connected to the network coupler.

5. The network coupler of claim 4, further comprising a microcontroller for processing acyclic, non-time-critical data transmitted on the network.

6. The network coupler of claim 1, further comprising a device for filtering out Ethernet messages that are not intended for the subscribers connected to the network coupler.

7. The network coupler of claim 1, further comprising a microcontroller for processing acyclic, non-time-critical data transmitted on the network.

8. The network coupler of claim 1, in combination with a network comprising a plurality of subscribers connected in series to the internal interface of the network coupler via a ring-type transmission path,
   wherein each subscriber is configured to interpret the Ethernet messages passing through on the ring-type transmission path and to perform a data interchange.

9. The network coupler of claim 8, wherein the ring-type transmission path is a two-channel line, and wherein the internal interface of the network coupler outputs the Ethernet messages to the connected subscribers on a first channel of the two-channel line, and the last subscriber, with respect to the network coupler, connected to the two-channel line returns the Ethernet messages on a second channel of the two-channel line, with each subscriber interposed between the last subscriber and the network coupler conveying the returned Ethernet messages to the internal interface.

10. A method for interchanging data between a network, on which Ethernet messages can be transmitted, and a plurality of subscribers, the method comprising the steps of:
   linking a plurality of subscribers in series using a ring-type transmission path;
   linking a network and the plurality of subscribers using a network coupler, wherein the network is linked to an external interface of the network coupler and the plurality of subscribers are linked to an internal interface of the network coupler;
   forwarding an Ethernet message received from the network via the external interface of the network coupler to the internal interface of the network coupler and outputting the Ethernet message onto the ring-type transmission path, the Ethernet message comprising a header, a trailer, and a data area between the header and trailer, the data area including a plurality of data blocks each assigned to one of the plurality of subscribers; interchanging useful data intended for each subscriber with the Ethernet message circulating on the ring-type transmission path through that subscriber, with each subscriber taking data from the data block assigned to the subscriber in the data area of the Ethernet message and inserting data into the data block assigned to the subscriber in the data area of the Ethernet message.

11. The method of claim 10, further comprising the step of filtering out Ethernet messages that are not intended for the subscribers connected to the ring-type transmission path.

12. The method of claim 10, further comprising the step of converting the Ethernet messages between the transmission physics of the network and the transmission physics of the ring-type transmission path.

13. The method of claim 12, further comprising the step of filtering out Ethernet messages that are not intended for the subscribers connected to the ring-type transmission path.

14. A network comprising:
a plurality of subscribers connected in series via a ring-type transmission path, each subscriber configured to interpret Ethernet messages passing along the ring-type transmission path and to perform data interchange; and
an Ethernet network coupler including an external interface, for linking to an external network on which Ethernet messages can be transmitted, and an internal interface linking the plurality of subscribers,
wherein an Ethernet message, including a header, a trailer, and a data area between the header and trailer, received via the external interface is forwarded to the internal interface, the data area including a plurality of data blocks each assigned to one of the plurality of subscribers, the Ethernet message output onto the ring-type transmission path, such that, upon the Ethernet message passing along the ring-type transmission path, each subscriber connected to the internal interface interchanges useful data intended for the subscriber with the Ethernet message circulating on the transmission path as it passes through that subscriber, with each subscriber taking data from the data block assigned to the subscriber in the data area of the Ethernet message and inserting data into the data block assigned to the subscriber in the data area of the Ethernet message.

15. The network of claim 14, wherein the ring-type transmission path is a two-channel line, and wherein the internal interface of the network coupler outputs the Ethernet messages to the connected subscribers on a first channel of the two-channel line, and the last subscriber, with respect to the network coupler, connected to the two-channel line returns the Ethernet messages on a second channel of the two-channel line, with each subscriber interposed between the last subscriber and the network coupler conveying the returned Ethernet messages to the internal interface.

16. The network of claim 14, wherein the network coupler further comprises a device that converts the Ethernet messages between the transmission physics of the network and the transmission physics of the ring-type transmission path, the device provided between the external interface and the internal interface.

17. The network of claim 14, wherein the network coupler further comprises a microcontroller that processes acyclic, non-time-critical data transmitted on the network.

18. The network of claim 14, wherein the network coupler further comprises a device that filters out Ethernet messages not intended for the subscribers connected to the network coupler.

19. A network coupler comprising:
an external interface, for linking to a network on which Ethernet messages can be transmitted; and
an internal interface, for linking a plurality of subscribers in series to a ring-type transmission path, with an Ethernet message received via the external interface forwarded to the internal interface and output onto the ring-type transmission path,
wherein, upon the Ethernet message passing through on the ring-type transmission path, each subscriber connected to the internal interface interchanges useful data intended for the subscriber with the Ethernet message circulating on the transmission path as it passes through the corresponding subscriber, such that the subscriber takes data from the data block assigned to the subscriber in the data area of the Ethernet message and inserts data into the data block assigned to the subscriber in the data area of the Ethernet message,
wherein a network comprising a plurality of subscribers is connected in series to the internal interface of the network coupler via a ring-type transmission path,
wherein each subscriber is configured to interpret the Ethernet messages passing through on the ring-type transmission path and to perform a data interchange,
wherein the ring-type transmission path is a two-channel line, and wherein the internal interface of the network coupler outputs the Ethernet messages to the connected subscribers on a first channel of the two-channel line, and the last subscriber, with respect to the network coupler, connected to the two-channel line returns the Ethernet messages on a second channel of the two-channel line, with each subscriber interposed between the last subscriber and the network coupler conveying the returned Ethernet messages to the internal interface.

20. A network comprising:
a plurality of subscribers connected in series via a ring-type transmission path, each subscriber configured to interpret Ethernet messages passing along the ring-type transmission path and to perform data interchange; and
an Ethernet network coupler including an external interface, for linking to an external network on which Ethernet messages can be transmitted, and an internal interface linking the plurality of subscribers,
wherein an Ethernet message received via the external interface is forwarded to the internal interface and output onto the ring-type transmission path, such that, upon the Ethernet message passing along the ring-type transmission path, each subscriber connected to the internal interface interchanges useful data intended for the subscriber with the Ethernet message circulating on the transmission path as it passes through that subscriber, with each subscriber taking data from the data block assigned to the subscriber in the data area of the Ethernet message and inserting data into the data block assigned to the subscriber in the data area of the Ethernet message,
wherein the ring-type transmission path is a two-channel line, and wherein the internal interface of the network coupler outputs the Ethernet messages to the connected subscribers on a first channel of the two-channel line, and the last subscriber, with respect to the network coupler, connected to the two-channel line returns the Ethernet messages on a second channel of the two-channel line, with each subscriber interposed between the last subscriber and the network coupler conveying the returned Ethernet messages to the internal interface.

* * * * *